United States Patent
Karge et al.

(10) Patent No.: US 7,974,632 B2
(45) Date of Patent: Jul. 5, 2011

(54) METHOD AND SYSTEM FOR THE LOCALIZATION OF A MOBILE WLAN CLIENT

(75) Inventors: Ralf Karge, Ludwigshafen (DE); Daniel Gerst, Frankenthal (DE)

(73) Assignee: Deutsche Telekom AG, Bonn (DE)

( * ) Notice: Subject to any disclaimer, the term of this patent is extended or adjusted under 35 U.S.C. 154(b) by 694 days.

(21) Appl. No.: 11/451,887

(22) Filed: Jun. 12, 2006

(65) Prior Publication Data

US 2007/0081496 A1  Apr. 12, 2007

(30) Foreign Application Priority Data

Jun. 10, 2005  (DE) .......................... 10 2005 026 788

(51) Int. Cl.
*H04W 24/00* (2009.01)
*H04W 4/00* (2009.01)

(52) U.S. Cl. .................... 455/456.1; 455/456.2; 370/338

(58) Field of Classification Search .................. 370/338; 709/224, 225; 342/451, 456, 460; 455/456.1, 455/456.5; 701/29

See application file for complete search history.

(56) References Cited

U.S. PATENT DOCUMENTS

| 7,212,828 B2 * | 5/2007 | Hind et al ................... 455/456.1 |
| 7,250,907 B2 * | 7/2007 | Krumm et al. ................ 342/451 |
| 2002/0095493 A1 * | 7/2002 | Byrnes .......................... 709/224 |
| 2003/0023726 A1 * | 1/2003 | Rice et al. ..................... 709/225 |

OTHER PUBLICATIONS

Paramvir Bahl and Venkata N. Padmanabhan, "Radar: An IN-Building AF-based User Location and Tracking System", 2000.

* cited by examiner

*Primary Examiner* — Charles N Appiah
*Assistant Examiner* — Kiet Doan
(74) *Attorney, Agent, or Firm* — Kenyon & Kenyon LLP

(57) ABSTRACT

A method and a system for the localization of a mobile WLAN client, located within a WLAN network of multiple WLAN stations. Static reference points are ascertained by measuring field strengths of the WLAN stations at spatial coordinates, aided by WLAN client(s), and assignment of the measured field strengths to the spatial coordinates in terms of data records. Self-learning ascertainment of further dynamic reference points is obtained by measuring field strengths of the WLAN stations, aided by WLAN client(s) moving through the region of the network, and assignment of the measured field strengths in terms of data records to the respective spatial coordinates calculated for this purpose, in the database server. This may be done to localize a WLAN client by selecting a plurality of nearest matched data records of static and dynamic reference points whose subsequently calculated center of gravity corresponds to the estimated position of the WLAN client.

17 Claims, 3 Drawing Sheets

METHOD AND SYSTEM FOR THE LOCALIZATION OF A MOBILE WLAN CLIENT

FIELD OF THE INVENTION

The present invention relates to a method and a system for the localization of a mobile WLAN (Wireless Local Area Network) client, located within a WLAN network having a plurality of WLAN stations, on the basis of the scene-analysis method in which reference points are ascertained by the WLAN client by measuring field strengths of the WLAN stations at known spatial coordinates, and the measured field strengths are assigned in terms of data records to the respective spatial coordinates in the database server.

BACKGROUND INFORMATION

Mobile terminals—such as PDAs or smartphones—are often equipped with a WLAN interface to permit a wireless data exchange over it. Among other things, a WLAN (wireless local area network) allows a localization of the mobile terminal located within the network, thereby permitting site-based services such as navigation. The increasing coverage by WLAN networks in shopping arcades, at public places such as railway stations or airports and in companies is reinforcing the trend of such site-based services.

SUMMARY OF INVENTION

Embodiments of the present invention involve the localization of a WLAN client within the framework of an indoor navigation using PDAs, on the basis of field-strength measurements by the client with the aid of a client/server architecture.

Embodiments of the present invention are based in-part on the localization method of a scene analysis. In this context, with the aid of predefined data records, the attempt is made to assign a position within the framework of the analyzed surroundings to the mobile terminal as client. The scene analysis involves comparing currently proceeding contents or events to predefined patterns. The pattern selection involves determining unique physical and/or visual feature characteristics of the object to be analyzed. In this way, ambiguities in the identification of the client position in the observed surroundings covered by the network are for the most part, sometimes even completely, prevented. The disadvantage of scene analysis, however, is that a correspondingly large potential data record must be available to precisely determine a position. GSM localization does not function well within a closed building. However, for indoor applications, a WLAN network may be used.

The reference entitled "*RADAR: An In-building AF-based User Location and Tracking System*," by Paramvir Bahl and Venkata N. Padmanabhan, describes an example for the implementation of a WLAN localization with the aid of scene analysis, among other things. The reference appears to describe an indoor navigation which is distinguished by quite high precision. However, this design approach has the disadvantage that the navigation is based merely on a measurement of field strengths of WLAN stations at known spatial coordinates. Thus, many static reference points must be utilized for calculating an estimated position of the WLAN client. In order to achieve a usably accurate navigation result in accordance with the method described in the reference, a correspondingly high expenditure is necessary.

Embodiments of the present invention provide for an improved localization of a mobile WLAN client, located within a WLAN network, on the basis of scene analysis, to the effect that as precise a localization of the WLAN client within the WLAN network as possible is permitted on the basis of field-strength measurements of surrounding WLAN stations, using a justifiable technical expenditure.

Embodiments of the present invention includes the process-engineering teaching that, in addition to the familiar ascertainment of static reference points, a self-learning ascertainment of further dynamic reference points is carried out, and specifically by measuring field strengths of the WLAN stations with the aid of WLAN clients moving through the region of the WLAN network and assigning, in terms of data records, the field strengths thus measured to the respective spatial coordinates calculated for this purpose, in order to localize a WLAN client by selecting a plurality of nearest matched data records of static and dynamic reference points via the scene-analysis method, whose subsequent weighting corresponds to the estimated position of the WLAN client. In further embodiments, the weighting is performed by calculating center of gravity.

Embodiments of the present invention provide for an enormous improvement in the accuracy of the estimated position of the WLAN client using only a few static reference points, for only a few static reference points, which are determined by initial measuring of field strengths at known spatial coordinates, are sufficient as a starting condition. According to a design approach of an embodiment of the present invention, the further reference points leading to the high accuracy are ascertained in self-learning fashion as dynamic reference points. A spatially precise indoor navigation solution is possible on this basis. Using an embodiment of the present invention, first attempts have already yielded extremely usable results after a training phase of approximately 3-4 communications per dynamically set reference point. Hit probabilities, i.e., the probability that the client is at the calculated position, for sufficiently trained regions in the area of 100 communications per dynamic reference point, are nearly 99%. If the WLAN client is not moving faster than 1.3 meters/second, then a difference of the distance between the estimated and the actual position of +/−2.5 meters is possible on average. Because the dynamic reference points are communicated over time, embodiment methods of the present invention also offer a certain degree of tolerance with respect to changes in the surroundings, such as rearrangement of furniture and plants, or moving persons. In embodiments of the present invention, the static reference points measured at the beginning are still necessary. They ensure the starting performance when using the design approach of the present invention. The number of static reference points is proportional to the starting performance and represents the basic knowledge about the region of the WLAN network. The more client movements taking place in this region, the more precise the determinations of the WLAN clients' positions become. Another advantage of the design approach according to the present invention is that the time-intensive, geometric measuring method for determining many static reference points is no longer necessary. Detailed information about a building or about a floor of a building is not necessary. For this reason, passing through obstacles such as walls or supporting pillars, which are not traversable, cannot be avoided. However, the dynamic map refinement counteracts this situation, since dynamic reference points can only be set at those locations at which a movement by the WLAN client is possible at all.

According to an embodiment of the present invention, it has turned out that a sufficiently precise localization of a WLAN client is possible when the three nearest matched data records of static and dynamic reference points are selected using the scene analysis method. These three nearest matched data records are combined to form a reference set. The client position is estimated using cluster algorithms for the similarity identification, for example, the Euclidian distance measure. The client position is ascertained by calculating the center of gravity of the triangular area subtended by the coordinate points yielded by the preferably three nearest matched data records. The possible location radius of the WLAN client is represented by the geometric distance of the estimated position to the reference point of the reference set having the largest value for the Euclidian distance measure. The field-strength pattern recognition practiced here is based specifically on the procedure of finding the three adjacent reference points to which the Euclidian distance measure is the least.

For the similarity analysis, only those values are compared to each other which are represented by the measurement. This reduces the data stock to be checked enormously. The additional information content, which can be included in a reference point at received WLAN stations, over and above the measured values, is not taken into consideration in the similarity identification. Information deficits of a reference point are entered with the value 0; the received field strength is thereby counted at 100%. Thus, it is still possible to determine position if a received WLAN station does not appear as information content in a reference point. Based on these circumstances, the method is even able to determine position when a WLAN station cannot be received briefly or even fails, provided sufficient WLAN stations can still be found for determining position.

According to an embodiment of the present invention, a weighted shift of the center of gravity to the better matched reference point among the nearest matched data records of the static and dynamic reference points is carried out. This measure may improve the estimate of the position considerably.

The spatial coordinates of the region covered by the WLAN network advantageously may be established according to the earth-centered, global map reference system WGS-84, the Gauss-Krüger coordinate system, and/or the like. WGS-84 (World Geodenic System 1984) is a geocentric, three-dimensional coordinate system, i.e., its origin is at the earth's center of gravity. Within the framework of the present invention, the WGS-84 is used only by preference as a reference system for absolute position determination, especially within buildings. The WGS-84 coordinates are usually stated in degrees of longitude and latitude. It is possible to use other suitable map reference systems, as well.

According to a further embodiment of the present invention, the position of the WLAN client estimated as a result of the localization is visualized on a graphic mapping of the region of the WLAN network. For this purpose, the WGS-84 spatial coordinates are assigned in the mapping for the identification of position points within the mapping. The graphic mapping, which, for example, may be a plan view of a building, a construction plan, a layout plan or a geographic map, is itself displayable with sufficient detail on the graphic display of a PDA as WLAN client.

To increase the localization accuracy, an embodiment of the present invention provides for a dynamic averaging of the selected, nearest matched reference position points by calculating the arithmetic mean or by ARMA filtering. For the averaging of the dynamically set reference points, the ARMA filter (autorecursive moving average filter) sums up the values of the past and the instantaneously measured values with the aid of weightings.

A further embodiment provides for subdividing a region of the WLAN network into a grid having sectors, one dynamic reference position point being ascertainable per sector, in order to limit the number of dynamic reference position points. In this way, the computational expenditure is minimized enormously without the quality of the navigation deteriorating significantly. This measure ensures that the number of dynamically acquired reference points is kept in an easily comprehensible frame. The estimated client position is compared to the grid. The sector where the WLAN client is located according to the estimate is ascertained. The received values of the field strength are then averaged into the center of gravity of the sector, taking a quality measure into account. The grid division of the region covered by the WLAN network is based on the WGS-84 reference coordinate system, which permits a grid division of 0.2-3 meters. In a further embodiment, when using the dynamic map, a grid element spacing of 1 meter has proven to be effective. This grid element spacing represents an optimal compromise between precision and the ambiguity of reference points when working with a grid element spacing that is too close.

According to a further embodiment of the present invention, in the scene analysis method used for the localization of the WLAN client, a plausibility check algorithm is implemented which performs a plausibility check of the data records of dynamic reference points selected as nearest matched, based on the speed of movement of the WLAN client. In a scene analysis method, it can occur again and again that reference points are very similar to each other, but are situated very far apart geometrically. In this event, the specified plausibility check may be implemented, which makes decisions based on the speed of movement of the WLAN client. In so doing, a time window, for example, is first opened for the WLAN client, the time window representing the period of time for an update of position data, plus a large-proportioned safety factor for transition delays. If the WLAN client updates the position within the time window, then the plausibility check is taken into account and the updating speed is measured. On the other hand, if the WLAN client exceeds the defined time window, the plausibility check is not performed. This measure may cover the case when, for example, the WLAN client is temporarily not using the localization, or a serious error has occurred in the transmission, e.g., a network error. Within the time window, a certain possible movement radius is available to the client in which the client may be able to move in any direction. In a further embodiment, the movement radius is calculated using the measured updating time and a predefined speed, as a rule, 1.3 meter/second. The previously estimated position of the WLAN client is established as the midpoint for the possible movement radius.

The method of the present invention for localization of a mobile WLAN client located within a WLAN network described in general above may be implemented in terms of hardware using a system in which the mobile WLAN client ascertains a few static reference points by measuring field strengths of the WLAN stations at known spatial coordinates and transmits them to a front-end server which assigns the measured field strengths to the respective spatial coordinates in terms of data records. The data records resulting therefrom may be stored in a database server connected to the front-end server. The additional dynamic reference points may be ascertained by measuring field strengths of WLAN stations received as a function of location, with the aid of the WLAN client moving through the region of the WLAN network, and feeding them to the front-end server. The front-end server assigns to these measured values, the respective spatial coordinates calculated for this purpose, which likewise may be stored as data records in the connected database server. After adequate teach-in of a sufficient number of dynamic reference points, it is possible to precisely determine the position of a WLAN client within the region in that, in accordance with the field strengths ascertained by the WLAN client, the front-end server selects a plurality of nearest matched data records of static and dynamic reference points using the scene analysis method, and subsequently localizes the client position by calculating the center of gravity.

In embodiments of the present invention, the front-end server is also able to implement the additional algorithms described above.

According to one measure improving the present invention, the database server is connected to a map-user provider, from which, for example, the database server obtains the mapping of the region of the WLAN network, e.g., a building plan view—for visualization purposes on the display of the WLAN client (PDA). This embodiment may relate to a practical application of the present invention within the framework of navigation. It is also conceivable to use embodiments of the present invention within the framework of other services that carry out activities on the basis of a position determination.

DETAILED DESCRIPTION

Figure 1:
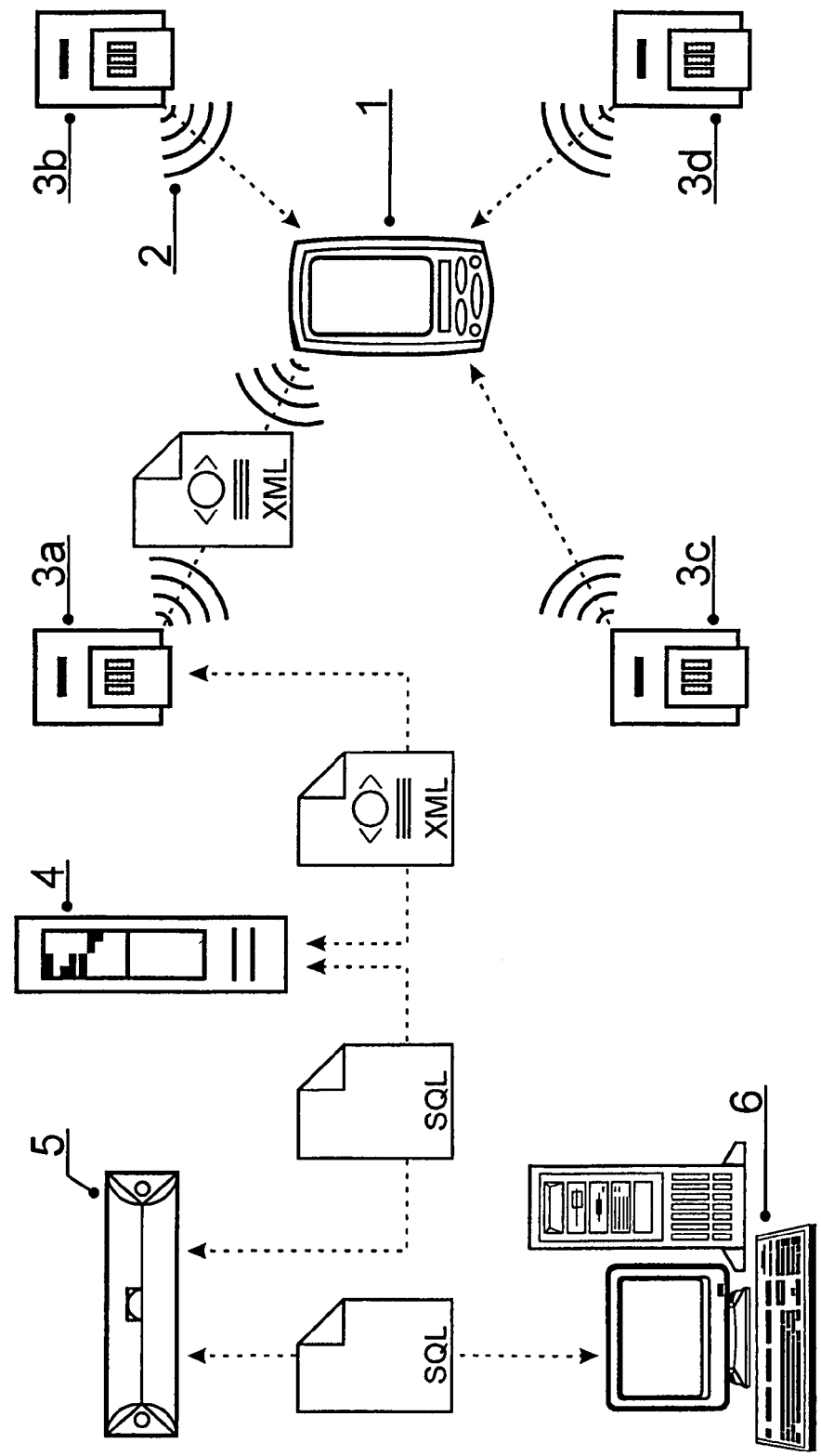
FIG. 1 shows a WLAN system architecture for the localization of a WLAN client.

According to FIG. 1, the system for WLAN localization is made up of four subsystems: a WLAN client 1 located within a WLAN network 2 having a plurality of WLAN stations 3a-3d, a front-end server 4 connected to WLAN stations 3a-3d, a database server 5 and a map-user provider 6.

WLAN client 1 is used for recording received field strengths of WLAN stations 3a-3d, which are needed for ascertaining the static and dynamic reference points, as well as for indoor navigation. The process management and the localization of WLAN clients 1 are undertaken by front-end server 4. Mappings in the form of the plan view of a building or other map material are made available with the aid of map-user provider 6. Moreover, in this exemplary embodiment, the location and user administration is carried out via map-user provider 6, as well. Database server 5 administers the data stock with respect to user data, mapping material and, in particular, the data records used for the localization. The communication between WLAN clients 1 and front-end server 4 takes place on the basis of XML (extended Markup Language) via HTTP protocol (HyperText Transfer Protocol). Map-user provider 6 and front-end server 4 access the data records of database server 5 with the aid of SQL (Structured Query Language) requests.

Figure 2:
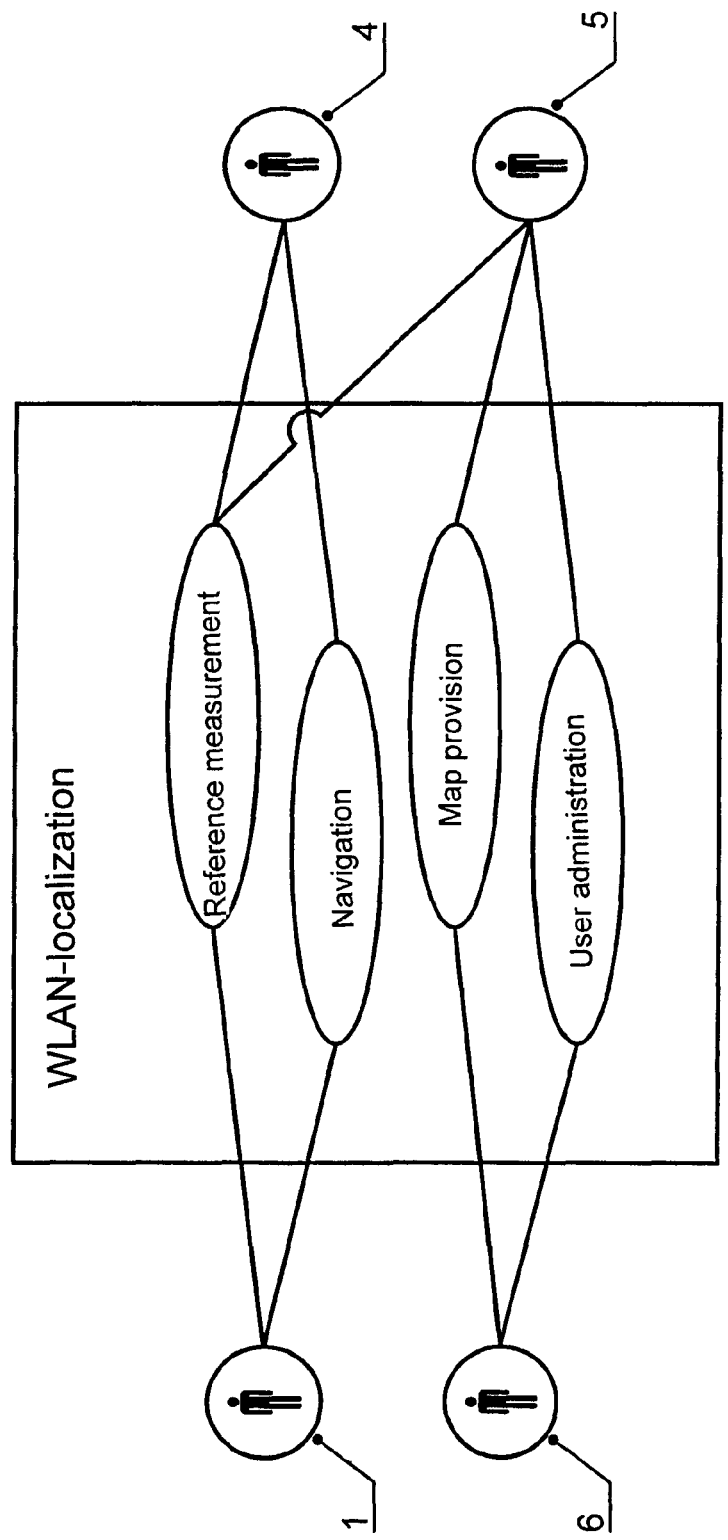
FIG. 2 shows a use-case diagram illustrating the interaction of the individual system components according to FIG. 1.

According to FIG. 2, the application is explained in light of the interaction of individual—above-described—system components with the aid of business processes, so-called use cases. A use case includes a plurality of different tasks used for carrying out a business-process objective. One or more participants are involved within the business-process phases of a use case. The interaction between the business processes and the acting participants is represented graphically in the use-case diagram, which offers a total overview of the WLAN localization.

The use-case diagram for the WLAN localization shown includes the following four business processes: reference measurement, navigation, mapping provision, and user administration. These use cases ensure the functionality and execution of the WLAN localization. One or more clients 1, front-end server 4, map-user provider 6 and database server 5 are involved as participants in the business processes. The individual business processes are dependent on many different static conditions and dynamic influence factors.

The business process of reference measurement includes the functionality for the measuring of reference points and the continuing storage of the measuring results. The use-case navigation provides a tool for the client localization on the basis of WGS-84 coordinates, as well as the creation of individual, dynamic field-strength maps for each floor of a building, which is recorded and measured in, in database server 5. With the aid of the mapping provision (map provision), it is possible to record buildings and floors together with the associated information, the WGS-84 reference points and the mappings in database server 5. The opening and administration of user accounts and the associated WLAN maps takes place via the user-administration business process.

Figure 3:
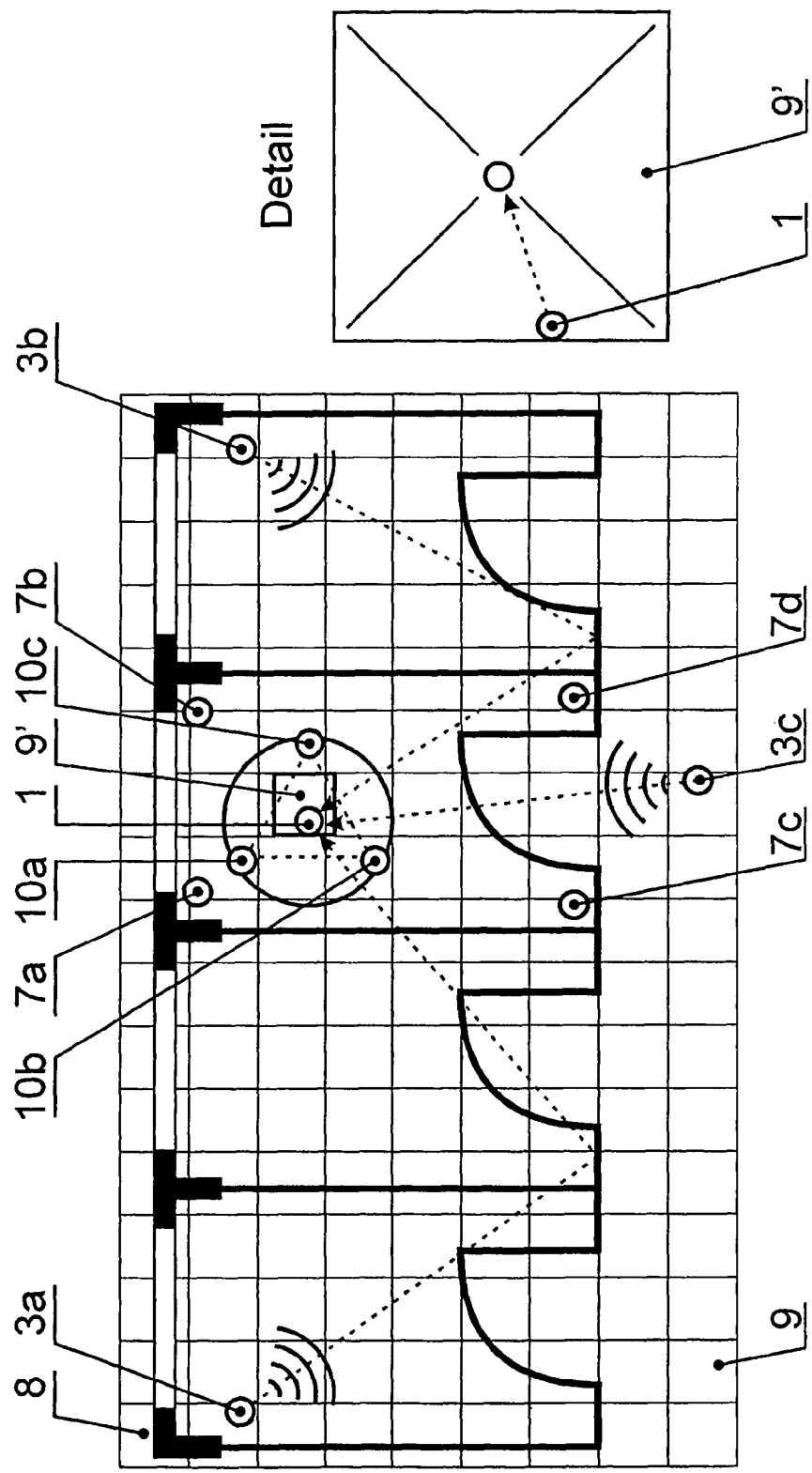
FIG. 3 shows a representation of the principle of scene analysis, including dynamic reference points.

FIG. 3 describes an indoor navigation using the method of the present invention. By the measurement of field strengths of WLAN stations 3a-3c at known spatial coordinates by WLAN client 1, initially a few static reference points 7a-7d are ascertained which are necessary as a starting condition. The spatial coordinates of the region covered by WLAN network 2 within the building are established according to the map reference system WGS-84. A grid, whose individual sectors 9 have a height and width of one meter, is defined on a stored graphic mapping 8 in the form of a plan view of a building. The spatial coordinates for identifying position points within mapping 8 are assigned to mapping 8.

In addition to static reference points 7a-7d thus ascertained, self-learning, further dynamic reference points 10a-10c are ascertained by measuring field strengths of WLAN stations 7a-7d with the aid of WLAN client 1 moving through the region of WLAN network 2, taking into account that the dynamic reference points must satisfy a certain quality measure, e.g., a plausibility check. The measured field strengths are subsequently assigned in terms of data records to the respective spatial coordinates calculated for this purpose, and these data records are stored in database server 5.

Static reference points 7a-7d and dynamic reference points 10a-10c thus obtained are used for localization of WLAN client 1 by the selection of a plurality of nearest matched data records of static and dynamic reference points using the scene analysis method known. The field-strength pattern recognition carried out is based on the procedure that three adjacent reference points 10a-10c are found to which the Euclidian distance measure is the least. The position of WLAN client 1 is ascertained by calculating the center of gravity of the triangular area thereby defined. The possible location radius of WLAN client 1 is represented by the geometric distance of the estimated position to that reference point 10 of the reference set having the largest value for the Euclidian distance measure. To increase the localization precision, the selected, nearest matched reference position points 10a-10c are averaged over time using ARMA filtering. As shown in FIG. 3, the position of WLAN client 1 thus estimated is brought to grid dimensioning by centering in the relevant sector 9'.

Design approach embodiments of the present invention may be used for other networks as well, i.e., networks other than WLAN networks. It is equally possible to take other existing or future radio communications network standards, such as GSM, Bluetooth, DVB-T (Digital Video Broadcasting—Terrestrial) and the like, as a basis, as well, in so far as they possess stationary transmission stations.

What is claimed is:

1. A method for the localization of a mobile wireless local area network (WLAN) client, located within a WLAN network having a plurality of WLAN stations, on the basis of a scene analysis method, comprising:

ascertaining static reference points by measuring field strengths of the WLAN stations at known spatial coordinates with the aid of WLAN client, and assignment of the measured field strengths to the respective spatial coordinates in terms of data records with the aid of predefined data records, the data records being compared to a predefined pattern mapped by the predefined data records to determine any unique characteristics;

conducting self-learning ascertainment of further dynamic reference points by measuring field strengths of the WLAN stations with the aid of WLAN clients moving through the region of the WLAN network, and assignment of the measured field strengths in terms of data records to the respective spatial coordinates calculated for this purpose, in order to localize a WLAN client using the scene analysis method, by selecting a plurality of nearest matched data records of static and dynamic reference points whose subsequent weighting corresponds to the estimated position of the WLAN client.

2. The method as recited in claim 1, further comprising selecting three nearest matched data records of the static and the dynamic reference points using the scene analysis method for the localization.

3. The method as recited in claim 1, further comprising carrying out a weighted shift of the center of gravity to the better matched reference point among the nearest matched data records of the static and the dynamic reference points in order to improve the estimate of the position.

4. The method as recited in claim 1, wherein the spatial coordinates of the region covered by the WLAN network are established according to one of the earth-centered, global map reference system WGS-84 and the Gauss-Krueger coordinate system.

5. The method as recited in claim 1, further comprising visualizing the position of the WLAN client, estimated as a result of the localization, on a graphic mapping of the region of the WLAN network, the spatial coordinates for the identification of position points within the mapping being assigned to the mapping.

6. The method as recited in claim 5, wherein the mapping of the region of the WLAN network represents the plan view of one of a building, an aerial image, a layout plan, and a construction plan, in order to permit a navigation.

7. The method as recited in claim 1, further comprising averaging over time the selected, nearest matched reference position points by calculating the arithmetic mean to increase the localization precision.

8. The method as recited in claim 1, further comprising dynamically averaging the selected, nearest matched reference position points using autorecursive moving average filter (ARMA) filtering to increase the localization precision.

9. The method as recited in claim 1, wherein the region of the WLAN network is subdivided into a grid having sectors, one dynamic reference position point being ascertainable per sector, in order to limit the number of dynamic reference position points.

10. The method as recited in claim 9, wherein the sectors of the grid have a length and width of about 0.2 to 3 meters.

11. The method as recited in claim 9, wherein the sectors of the grid have a length and width of 1 meter.

12. The method as recited in claim 1, wherein, implemented in the scene analysis method used for the localization of the WLAN client is a plausibility-check algorithm which performs a plausibility check of the data records of static and dynamic reference points selected as nearest matched, based on the movement speed of the WLAN client.

13. A system for the localization of a mobile WLAN client located within a WLAN network having a plurality of WLAN stations, the WLAN client ascertaining static reference points by measuring field strengths of the WLAN stations at known spatial coordinates and transmitting them to a front-end server which assigns the measured field strengths to the respective spatial coordinates in terms of data records and stores them, with the aid of predefined data records, the data records being compared to a predefined pattern mapped by the predefined data records to determine any unique characteristics, wherein, for the self-learning ascertainment of further dynamic reference points, the WLAN client, moving through the region of the WLAN network, measures field strengths of the WLAN stations received depending on location, which the front-end server assigns in terms of data records to the respective spatial coordinates calculated for this purpose, and stores in order to localize a WLAN client, in that, using the scene analysis method, the front-end server selects a plurality of nearest matched data records of static and dynamic reference points in accordance with the field strengths ascertained by the WLAN client, and subsequently weights them in order to ascertain the estimated position of the WLAN client.

14. The system as recited in claim 13, further comprising a map-user provider which is connected to the database server and from which the database server obtains at least the mapping of the region of the WLAN network for visualization purposes.

15. The system as recited in claim 13, wherein the WLAN client is a mobile terminal having a graphic user interface in the manner of one of a smartphone and a PDA.

16. A non-transitory computer-implemented program product including a computer-readable medium having instructions adapted to execute a method for the localization of a mobile WLAN client located within a WLAN network having a plurality of WLAN stations, the WLAN client ascertaining static reference points by measuring field strengths of the WLAN stations at known spatial coordinates and transmitting them to a front-end server which assigns the measured field strengths to the respective spatial coordinates in terms of data records and stores them, wherein, for the self-learning ascertainment of further dynamic reference points, the WLAN client, moving through the region of the WLAN network, measures field strengths of the WLAN stations received depending on location, which the front-end server assigns in terms of data records to the respective spatial coordinates calculated for this purpose, and stores in order to localize a WLAN client, in that, using the scene analysis method, the front-end server selects a plurality of nearest matched data records of static and dynamic reference points in accordance with the field strengths ascertained by the WLAN client, and subsequently weights them in order to ascertain the estimated position of the WLAN client, wherein the computer-implemented program product is operable according to a method for the localization of a mobile WLAN client, located within a WLAN network having a plurality of WLAN stations, on the basis of a scene analysis method, comprising:

ascertaining static reference points by measuring field strengths of the WLAN stations at known spatial coordinates with the aid of WLAN client, and assignment of the measured field strengths to the respective spatial coordinates in terms of data records with the aid of predefined data records, the data records being compared to a predefined pattern mapped by the predefined data records to determine any unique characteristics;

conducting self-learning ascertainment of further dynamic reference points by measuring field strengths of the WLAN stations with the aid of WLAN clients moving through the region of the WLAN network, and assignment of the measured field strengths in terms of data records to the respective spatial coordinates calculated for this purpose, in order to localize a WLAN client using the scene analysis method, by selecting a plurality of nearest matched data records of static and dynamic reference points whose subsequent weighting corresponds to the estimated position of the WLAN client, and wherein the routine for calculating the estimated position of the WLAN client is implemented by corresponding control commands stored by the computer-implemented program product.

17. A data carrier having a computer program product as recited in claim 16.

\* \* \* \* \*